United States Patent
Martoch

(10) Patent No.: US 10,060,589 B2
(45) Date of Patent: Aug. 28, 2018

(54) LIGHT DEVICE

(71) Applicant: Varroc Lighting Systems, s.r.o., Senov u Noveho Jicina (CZ)

(72) Inventor: Jan Martoch, Hranice (CZ)

(73) Assignee: VARROC LIGHTING SYSTEMS, S.R.O. (CZ)

( * ) Notice: Subject to any disclaimer, the term of this patent is extended or adjusted under 35 U.S.C. 154(b) by 360 days.

(21) Appl. No.: 14/883,820

(22) Filed: Oct. 15, 2015

(65) Prior Publication Data

US 2016/0109098 A1 Apr. 21, 2016

(30) Foreign Application Priority Data

Oct. 18, 2014 (CZ) .............................. PV 2014-711

(51) Int. Cl.
*F21S 41/33* (2018.01)
*F21S 43/14* (2018.01)
(Continued)

(52) U.S. Cl.
CPC ............. *F21S 41/337* (2018.01); *F21S 43/14* (2018.01); *F21S 43/237* (2018.01);
(Continued)

(58) Field of Classification Search
CPC ...... F21S 41/24; F21S 41/285; F21S 48/1376; F21S 48/215; F21S 48/2206;
(Continued)

(56) References Cited

U.S. PATENT DOCUMENTS

| | | | |
|---|---|---|---|
| 6,527,411 B1* | 3/2003 | Sayers | F21S 48/1154 362/237 |
| 7,182,497 B2* | 2/2007 | Lee | F21V 7/0091 348/E9.027 |

(Continued)

FOREIGN PATENT DOCUMENTS

| | | |
|---|---|---|
| CZ | 20120257 A3 | 10/2013 |
| EP | 1055867 | 11/2000 |
| JP | S5729008 A | 2/1982 |
| JP | 2005-347224 A | 12/2005 |

OTHER PUBLICATIONS

Search Report of the Industrial Property Office of the Czech Republic in Corresponding Czech Application PV 2014-711 completed Apr. 23, 2015 (1 page).

*Primary Examiner* — Robert May
*Assistant Examiner* — Leah S Macchiarolo
(74) *Attorney, Agent, or Firm* — Hovey Williams LLP; Joan Herman

(57) ABSTRACT

A light device comprises an elongated light guide (2) and a LED source (1) seated in the light guide entry part (3) for emitting the light beam into the light guide (2). The entry part of the light guide comprises mutually intersecting parts of at least two ellipsoids (11, 21) arranged with their main axes (14, 24) next to each other. The LED light sources are fitted in the first focuses (15, 25) of the ellipsoids for emission of light beams and their reflection from the elliptic walls (13, 23) thereof to the second focuses (16, 26) thereof, laying inside the light guide in different distances from the first focuses. The distance between the first focus (15) and the second focus (16) of the first ellipsoid (11) preferably equals at least 1.5 times the distance between the first focus (25) and the second focus (26) of the second ellipsoid (21).

6 Claims, 2 Drawing Sheets

Figure 1:
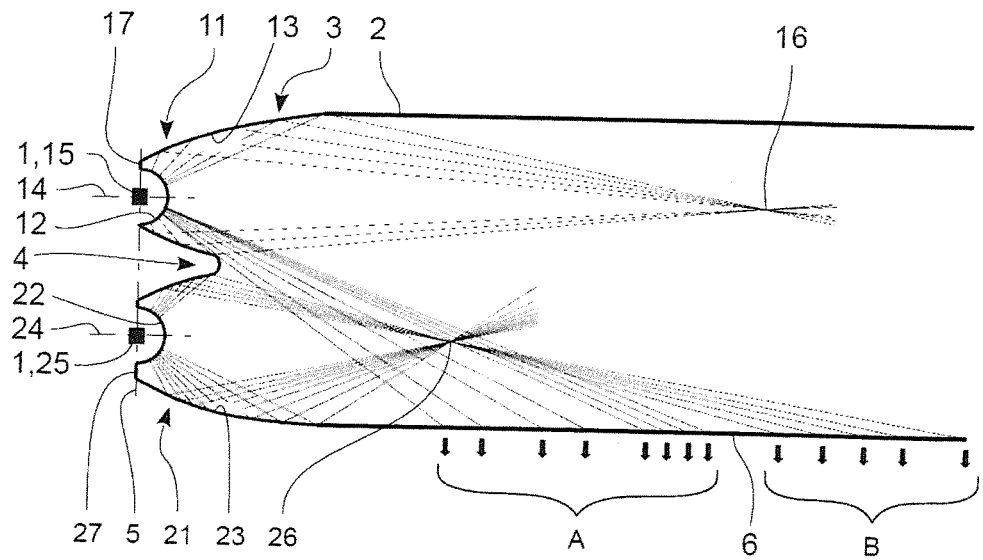

(51) Int. Cl.
*F21S 43/27* (2018.01)
*F21S 43/237* (2018.01)
*F21S 43/241* (2018.01)
*F21S 43/245* (2018.01)
*F21S 43/249* (2018.01)
*F21S 45/47* (2018.01)

(52) U.S. Cl.
CPC ........... *F21S 43/241* (2018.01); *F21S 43/245* (2018.01); *F21S 43/249* (2018.01); *F21S 43/27* (2018.01); *B60Q 2400/20* (2013.01); *F21S 45/47* (2018.01)

(58) Field of Classification Search
CPC .. F21S 48/2237; F21S 48/225; F21S 48/2268; F21S 48/2281
See application file for complete search history.

(56) References Cited

U.S. PATENT DOCUMENTS

| | | | |
|---|---|---|---|
| 7,766,507 B2 | 8/2010 | Nakajima | |
| 2006/0087860 A1* | 4/2006 | Ishida | F21S 48/1159 362/517 |
| 2006/0239020 A1* | 10/2006 | Albou | B60Q 1/26 362/520 |
| 2006/0285347 A1* | 12/2006 | Okada | F21S 48/1159 362/516 |
| 2009/0116237 A1* | 5/2009 | Zhu | G02F 1/133603 362/241 |
| 2012/0033441 A1* | 2/2012 | Sousek | F21S 48/215 362/555 |
| 2013/0242590 A1* | 9/2013 | Fedosik | F21S 48/1159 362/521 |
| 2014/0056015 A1* | 2/2014 | Martoch | F21S 48/2237 362/487 |

* cited by examiner

LIGHT DEVICE

FIELD OF THE INVENTION

The invention relates to a new light device of motor vehicles consisting of a LED light source and an elongated light guide, wherein the LED light source is seated in a recess of the entry part of the light guide for emitting the light beam into the light guide.

BACKGROUND INFORMATION

In the field of lighting technology, light emitting diodes, referred to with the abbreviation LED, are frequently used as a light source instead of the conventional halogen bulbs. LED light sources have also found a wide application in the lights of motor vehicles. However, LED light sources emit low-intensity light and therefore they are installed in higher quantities in a flat arrangement to increase the total luminous flux intensity. Among the lights of motor vehicles light guides occupy a special position as their elongated shape makes them especially suitable to create light lines positioned along the outline of headlights, or separately to create warning lights, e.g. positional, brake, indicator, or daily orientation lights. At present, light guides often fulfill signal light functions subject to higher requirements for the luminous flux, as e.g. the daily light in headlights and the rear brake and direction indication lights in the rear lamps. LED light sources are also used to supply light to the light guides of motor vehicles. They are located on the light guide face or they are installed in a recess of the entry part of the light guides. In principle, due to a small light guide diameter just one LED light source can only be used in one entry part of the light guide. The dimensions of most LED's in the market do not make it possible to use more than one diode in the entry part of the light guide. White LED's with miniature dimensions and a sufficient output for light guide applications are newly available in the market. The use of these miniature LED's enables a design in which two and more these LED's are fitted at one entry of a light guide. Using more than one LED at the light guide entry is only possible on condition the entry surface of the light guide is flat and no type of collimator can be used mainly to reduce the optical characteristics of the LED and to support subsequent propagation of light in the light guide. This design can only be used for power applications, as e.g. the daily lighting. For the time being, LED's are not available for the red light, i.e. sources necessary for light guide applications in rear group lamps for the "stop" function. The luminous flux in a light guide with a LED light source arranged on the light guide face may not be sufficient. Therefore, to increase the luminous flux the entry part of the light guide often has a parabolic shape that collimates light into the optical axis direction. However, the light guides have a small diameter and even a parabolic shape of the entry part does not guarantee a sufficient luminous flux, or efficient light distribution in the light guide.

The document U.S. Pat. No. 7,766,507 describes a shaped collimation lens with more elliptic surfaces for collimation of the luminous flux from the LED light source to the direction of the optical axis of the collimation lens. The side of the collimation lens facing the LED light source has a spherical recess in the center of which the LED light source is mounted. Thus, the rays emitted from the LED light source enter the collimation lens through the wall of the spherical recess without refraction. On its outer perimeter the collimation lens has the shape of the first ellipsoid whose first focus also lies in the center of the spherical recess where the LED light source is mounted. In its perimeter area, the side of the collimation lens, averted from the LED light source consists of a sector of the second ellipsoid lying inside the first ellipsoid and in the central area around the optical axis it consists of the vertex of the third ellipsoid oriented in the opposite direction against the first and second ellipsoid. The part of the rays that emitted from the LED light source in the perimeter area fall on the inner elliptic surface of the first ellipsoid and are refracted at a sharp angle to the optical axis and are collimated to the optical axis direction by passing through the elliptic area of the second ellipsoid. The part of the rays that emitted from the LED light source in the central area fall on the inner elliptic surface of the third ellipsoid and are refracted to the optical axis direction by passing through the inner elliptic surface of the third ellipsoid. To reinforce the luminous flux, the collimation lenses are arranged flatwise next to each other while the collimation lenses direct the rays of their LED light sources to the directions parallel to the optical axis of the light device. The collimation lenses according to the document U.S. Pat. No. 7,766,507 markedly collimate the light of the LED light source to the optical axis direction and therefore in a flat arrangement they are designed for area lighting and projection. Using individual collimation lenses for light guides of motor vehicles appears to be difficult especially due to their excessive size.

The aims of the invention are to eliminate the shortcomings of the prior art, increase the LED light source efficiency, improve concentration of the rays of the LED light source in the light guide, prevent losses of light from the light source in the light guide, achieve a better distribution and better homogeneity of the light beam propagating through the light guide. Another aim of the invention is to enable using of standard LED light sources to supply light guides designed for light functions and to achieve higher luminous fluxes.

Principle of the Invention

The aim of the invention is fulfilled by a light device consisting of a LED source and an elongated light guide, wherein the LED light source is seated in the entry part of the light guide for emitting the light beam into the light guide, wherein, according to the invention, the entry part of the light guide consists of mutually intersecting parts of at least two ellipsoids arranged with their main axes next to each other while the LED light sources are fitted in the first focuses of the ellipsoids for emission of light beams and their reflection from the elliptic walls of the ellipsoids to the second focuses of the ellipsoids lying inside the light guide in different distances from the first focuses of the ellipsoids. In other words, the distance between the second focus and the first focus in one of the ellipsoids is different than the distance between the second focus and the first focus in another of the ellipsoids. The ellipsoids can preferably have a rotational shape and their main axes can be arranged in parallel.

The distance of the second focus of the first ellipsoid from the first focus of the first ellipsoid can be preferably equal to at least 1.5 times the distance of the second focus of the second ellipsoid from the first focus of the second ellipsoid.

An advantage of the light device in accordance with the invention is higher efficiency of the LED light sources, better distribution and better homogeneity of the light beam propagating through the light guide. Another advantage is the possibility of using a suitable setting of the ratio of the focal distances of the elliptic entry parts to optimize the distribution of the light beam inside the light guide.

OVERVIEW OF FIGURES IN THE DRAWINGS

Figure 2:
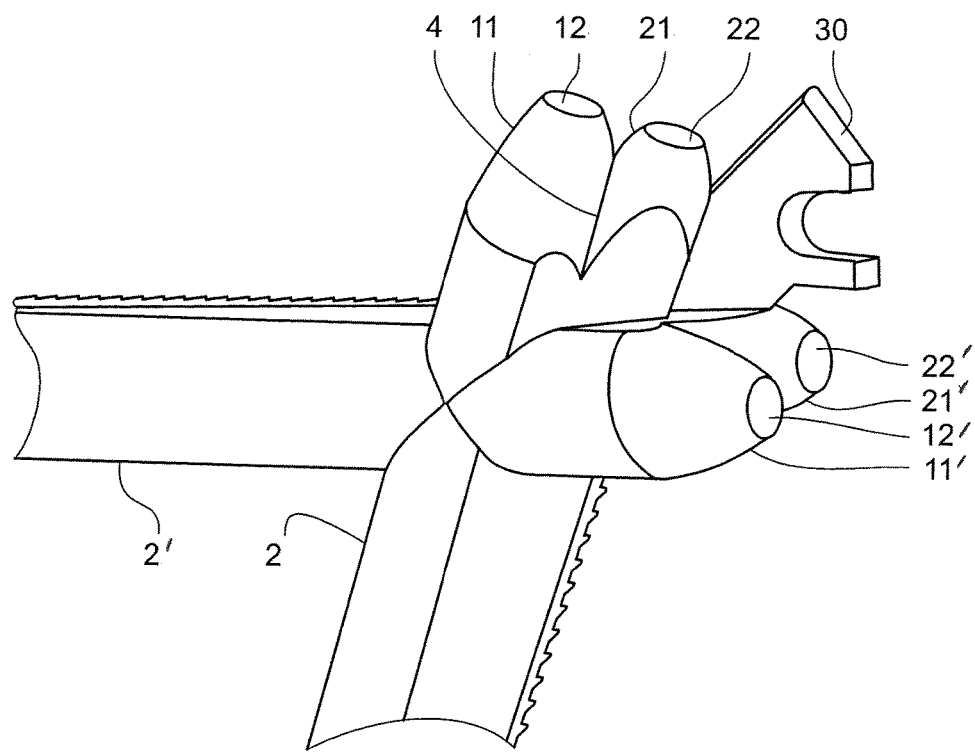
Figure 3:
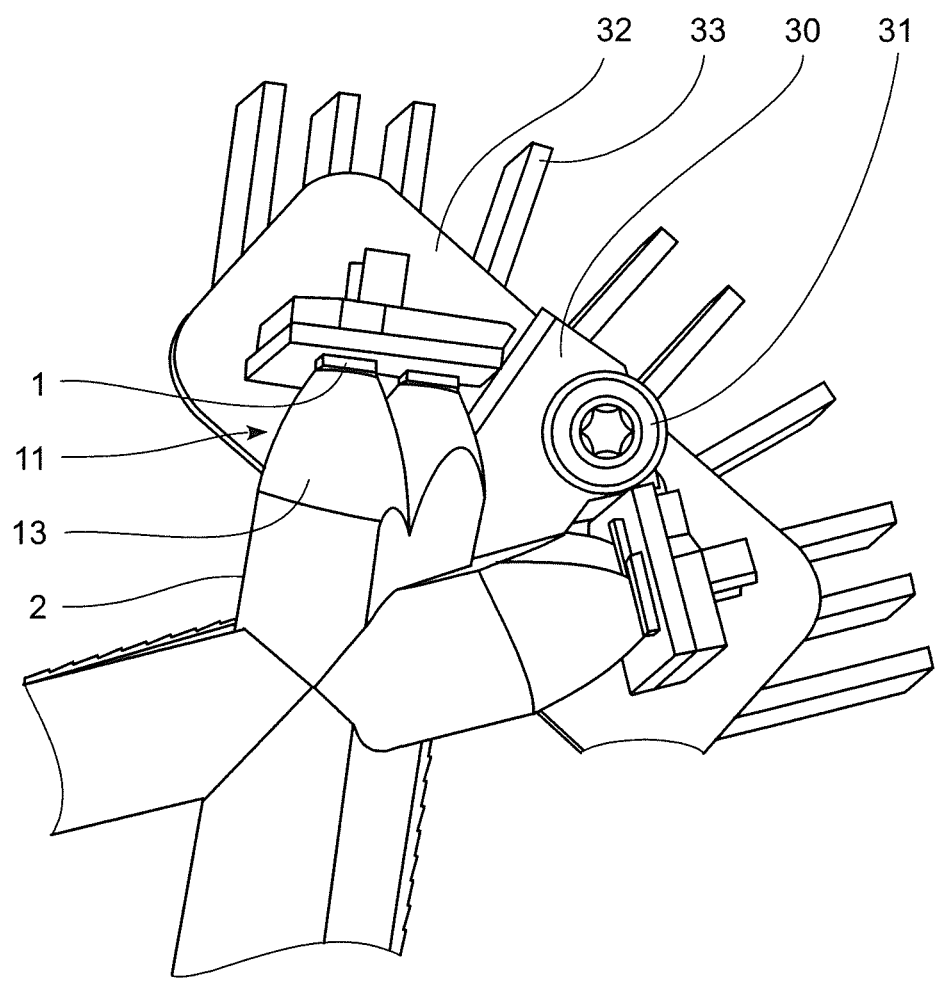

The light device in accordance with the invention is explained with the use of drawings, where:

FIG. 1 shows a longitudinal section of the light guide with its entry part consisting of two ellipsoids, FIG. 2 presents a perspective view of the entry parts of the two intersecting light guides and FIG. 3 shows a perspective view of the entry parts of the light guides with the LED light sources.

EXAMPLE OF AN EMBODIMENT OF THE INVENTION

FIG. 1 shows, in a longitudinal sectional view, an elongated light guide 2 whose entry part 3 consists of two ellipsoids 11, 21 that are arranged with their main axes 14, 24 next to each other and whose elliptic walls 13, 23 intersect in the intersection line 4. The ellipsoids 11, 21 are shortened at the side of their main vertexes by the plane 5 of a transversal section, which forms the faces 17, 27 of the ellipsoids 11, 21. The faces 17, 27 of the ellipsoids 11, 21 contain spherical recesses 12, 22, whose centers lie on the main axes 14, 24 and at the same time in the first focuses 15, 25 of the ellipsoids 11, 21.

The LED light sources 1 lie in the first focuses 15, 25 of the ellipsoids 11, 21 so that the beams of the LED light sources 1 pass through surfaces of the spherical recesses 12, 22 without refraction, fall onto and are reflected from the elliptic walls 13, 23 to the second focuses 16, 26 of the ellipsoids 11, 21, which are found inside the light guide 2 in different distances from the first focuses 15, 25. The LED light sources 1 accommodated in the first focuses 15, 25 can emit light beams of different colors. The distance of the second focus 16 of the first ellipsoid 11 from the first focus 15 of the first ellipsoid 11 preferably is at least 1.5 times the distance of the second focus 26 of the second ellipsoid 21 from the first focus 25 of the second ellipsoid 21. The ellipsoids 11, 21 preferably have a rotational shape and their main axes 14, 24 are arranged in parallel. However, the ellipsoids 11, 21 may be arranged in such a way that their main axes are situated obliquely with regard to each other. Also, in the longitudinal direction, the faces 17, 27 of the ellipsoids 11, 21 do not have to be on one plane, but they may be shifted with regard to each other in the direction of the main axes, or inclined. The light rays from the LED light source 1 are bound to the light guide 2 through a spherical entry surface. A part of the light bound this way further spreads through the light guide until the rays fall onto the light emitting optical device, which is part of the light guide and is designed in such a way to change the direction of rays propagating through the light guide and to send rays A, B transversally through the material of the light guide 2 through the exit surface 6 of the light guide 2. Another part of the rays, bound to the light guide 2 via the entry spherical surface of the recess 12, 22 fall onto the elliptic surface 13, 23 that surrounds the entry spherical surface of the recess 12, 22. Total light reflection occurs on the elliptic wall 13, 23 and the light rays are directed towards the light guide 2 body. The surface of the elliptic wall 13, 23 forming an elliptic collimator has two focal points. The first focal point 15, 25 contains the chip of the LED light source 1, the other focal point 16, 26, where the light rays converge, is found in the light guide 2 body. The light rays pass through the focus 16, 26 and spread further through the light guide 2 until they fall onto the light unbinding optical device and leave the light guide 2. The position of the second focus 16, 26 of the elliptic surface of the ellipsoid 11, 21 influences the general appearance of the light guide 2 and it can be used to set a homogeneous appearance of the light guide 2 to unbind approximately the same amount of light at the beginning and at the end of the light guide. To this end, conditions must be adjusted in such a way to get as much light as possible through the light guide body to its end, i.e. as far away as possible from the LED light source 1. The further away is the first focal point 15, 25 from the beginning of the light guide 2, the more the light rays reflected from the elliptic surface of the entry part 3 spread along the central axis of the light guide 2 and the further they can be sent in the light guide 2 to get a more balanced ratio between the luminance of the light guide 2 at the beginning and at the end so that both the ends of the light guide can appear equally bright to an observer. But on the other hand, a too distant position of the second focus 16, 26 from the elliptic surface of the entry part 3 reduces efficiency of the entire binding of light to the light guide 2. If there are two elliptic collimators at the entry 3 of the light guide 2, the second focal points should be preferably located in the light guide 2 body in different positions so that a mutual change of the positions can be used to tune and adjust the ratio of luminances at the beginning and at the end of the light guide 2.

FIG. 2 shows the entry parts of two light guides 2 or 2', respectively, that consist of two ellipsoids 11, 21 or 11', 21' in each case. The ellipsoids 11, 21 intersect in a visible intersection curve 4. In the area of the vertexes the ellipsoids 11, 21 or 11', 21', respectively are fitted with spherical recesses 12, 22 or 12', 22' for seating of the LED light sources. The light guides 2, 2' as well as their entry parts are made using the injection molding method and are made of the same plastic material. A holder 30 for fixing the light guide to the lamp body or in a special bushing to the car body is also produced with the use of injection molding in one piece with the light guides 2, 2'. The light guides 2, 2', which cross each other in different directions, are part of an enclosed shape that can be selected with respect to the purpose and location of the light guides in a lamp bushing or in the car body. The light guides 2, 2' are made of a transparent material, most commonly of PC, or PMMA, where optical purity of the material is emphasized. Material without additives must be used, because additives impair the resulting optical purity of the material. Given the long optical routes of the beam in the light guide it would result in increased losses due to light absorption and also the white light would become yellow from the light guide beginning towards the end, as different wavelengths are absorbed in a different way. When the light guides cross each other as shown in FIG. 2, the light guides 2, 2' influence each other as the light from the LED light source for the horizontally oriented light guide 2' gets into the vertical light guide 2 and vice versa. In the production, one mold is used for both the crossed light guides 2, 2' and the unbinding optical devices are made of a special insert, specific for each light guide 2, 2'.

FIG. 3 illustrates fixing of the light guide 2 using a holder 30 and a fixing screw 31 to a cooler 32 equipped with cooling fins 33. FIG. 3 also shows mounting of the LED light source 1 in the recess of the top part of the elliptic wall 13 of the first ellipsoid 11.

A disadvantage of using elliptic collimators at the light guide entry may consist in increased requirements for accuracy of fitting the LED to the PCB and to the cooler and subsequent orientation of the LED, PCB, cooler sub-assembly with regard to the entire light guide. Therefore, both the PCB's with LED's are installed on a common cooler that exactly defines their spatial position. The position of the PCB boards with respect to the cooler is delimited by the holder (locating pins) that are part of the cooler, and the boards are subsequently secured with two fixing screws 31 each. The light guide 2, 2' is then attached to the cooler 32 with the use of the holder 30 (locating pin) and lock screw 31.

In one embodiment, the LED light sources 1 can be coupled to a control unit which can be configured to provide the specific desired output characteristics of the output light spot, and of the output light area. In addition, the LED light sources 1 can be alternately or jointly controllable by the control unit, and can be configured to provide daily lighting, indicator lights, rear contour lights, or front contour lights of motor vehicles or other applications.

LIST OF REFERENCE SIGNS

1 LED light source
2 Light guide
4 intersection curve
5 transversal section plane
6 exit surface
11 First ellipsoid
12 Recess
13 Elliptic wall
14 Main axis
15 First focus
16 Second focus
17 Face
21 Second ellipsoid
22 Recess
23 Elliptic wall
24 Main axis
25 First focus
26 Second focus
27 Face
30 holder
31 fixing screw
32 cooler
33 cooling fin

The invention claimed is:

1. A light device of motor vehicles comprising an elongated light guide (2) having an entry part (3) including vertex parts of at least two ellipsoids (11, 21) arranged next to each other, wherein each of the ellipsoids (11, 21) includes one LED light source (1) positioned in a first focus (15, 25) of the ellipsoids (11, 21) for emission of light rays and their reflection from elliptic walls (13, 23) of the ellipsoids (11, 21) to a second focus (16, 26) of the ellipsoids (11, 21) lying inside the light guide (2), wherein the distance of the second focus (16, 26) from the first focus (15, 25) of at least one of the ellipsoids (11, 21) differs from the distance of the second focus (16, 26) from the first focus (15, 25) of some of the other ellipsoids (11, 21).

2. The light device according to claim 1, wherein the ellipsoids (11, 21) have a rotational shape and are arranged with their main axes (14, 24) in parallel.

3. The light device according to claim 1, wherein the distance of the second focus (16) from the first focus (15) of some of the ellipsoids (11) equals at least 1.5 times the distance of the second focus (26) from the first focus (25) of some of the other ellipsoids (21).

4. The light device according to claim 1, wherein the ellipsoids (11, 21) are shortened at the side of their vertexes by a plane (5) of a transversal section, which forms faces (17, 27) of the ellipsoids (11, 21) which are provided with spherical recesses (12, 22), whose centers lie in the first focuses (15, 25) of the ellipsoids (11, 21).

5. The light device according to claim 1, wherein the first focus (15, 25) of the ellipsoids (11, 21) accommodate LED light sources (1) emitting light beams of different colors.

6. The light device according to claim 1, wherein the LED light source (1) is coupled to a control unit to provide desired output characteristics of an output light spot and an output light area, wherein the LED light source (1) is alternately or jointly controllable by the control unit, and is configured to provide daily lighting and/or indicator light and/or rear contour light and/or front contour light.

* * * * *